Oct. 19, 1971   R. F. GRUNWALD ET AL   3,613,444
TESTING DEVICE FOR FILM

Filed Aug. 13, 1969

INVENTORS:
ROBERT F. GRUNWALD,
RICHARD R. WALLACE,
HOWARD BOWEN,

By: Mason, Kolehmainen, Rathburn, & Wyss,
Attorneys.

INVENTORS:
ROBERT F. GRUNWALD,
RICHARD R. WALLACE,
HOWARD BOWEN,
By: Mason, Kolehmainen,
Rathburn & Wyss,
Attorneys.

3,613,444
TESTING DEVICE FOR FILM
Robert F. Grunwald, Northbrook, Richard R. Wallace, Wilmette, and Howard Bowen, Evanston, Ill., assignors to The Harwald Company, Inc., Evanston, Ill.
Filed Aug. 13, 1969, Ser. No. 849,841
Int. Cl. G01n 3/20
U.S. Cl. 73—157                                    5 Claims

ABSTRACT OF THE DISCLOSURE

The film to be tested is moved along a predetermined path at high speed and is supported by the flanges of a roller which engage the film at points spaced from the edges of the film, preferably in the areas of the edges of the picture track of the film. A fixed jewel section engages one face of the film and supports the edge thereof in the vicinity of a test feeler which engages the film on the face opposite said one face. The test feeler is resiliently urged into engagement with the film at a point spaced longitudinally from the fixed jewel section but the longitudinal separation is small so that the feeler has substantial movement when the leading edge of a break in the film is encountered.

---

As shown in Pat. No. 2,699,676, dated Jan. 18, 1955, a feeler runs under pressure, in contact with, and partially deflecting, an edge portion of moving film which is remotely supported nearer the center thereof. The feeler is urged to further flex the contacted film when a break-weakened portion is coincident with the feeler contact and, in doing so, to signal the presence of the break so that the film can be stopped and repaired. The film flexure is in only one direction, is minimal, and is affected by variations in film coupling, and with both edges of the break engaging, the feeler provides dual opposition to the feeler action, reducing its sensitivity. Furthermore, if the film is more resilient, due to humidity, temperature, manufacturing process variations, etc., it may yield sufficiently to actuate the feeler contact in the absence of a defect. Therefore, the significant movement of the feeler is somewhat limited and of comparatively short duration and is affected often by factors other than film damage. These factors necessitate a comparatively slow film testing speed in order to be sure of detecting all breaks in the film without falsely indicating a defect and may require frequent readjustment to provide optimum response to damage when inspecting films of different elasticity.

In the present invention, the edge portion of the film adjacent the feeler is supported by means of a fixed member which engages the film on the face opposite the one engaged by the feeler, this fixed member being spaced slightly ahead of the feeler so that when a break occurs the feeler depresses the leading edge of the break while the trailing edge of the break is still supported by the fixed member. The duration and effective distance for feeler movement is therefore substantially increased, whereby the speed at which the film may be tested can be more than doubled, and the speed checking possibilities of other defect checking devices described in said patent can be fully utilized. The response to damage is thus increased, while the spurious response due to irrelevant changes in film characteristics is decreased, providing greater accuracy, sensitivity, speed of response or desired combinations of these.

The invention contemplates an automatically operative motion picture film inspecting device for splices, sprocket run-off, broken sprocket holes, sprocket tear and transversely disposed breaks extending to either one or both of the film edges which can operate at film speeds as high as two thousand feet a minute, whereby one device will do much more work than it would operating at conventional speeds of approximately eight hundred feet a minute with no increase in personnel.

The invention is primarily directed to improvements in the detection of film breaks which extend to the edge of the film, a further object of the invention being to provide such a device that can be located anywhere along a path of film movement that is convenient to the splicer and which can receive the film in its testing position without necessarily separating the feelers and disturbing their adjustment each time a film is threaded into place.

The disclosure of said Pat. No. 2,699,676, is hereby incorporated by reference for a better understanding of the improvement herein described and claimed in association with the drawings herein in which:

Figure 1:
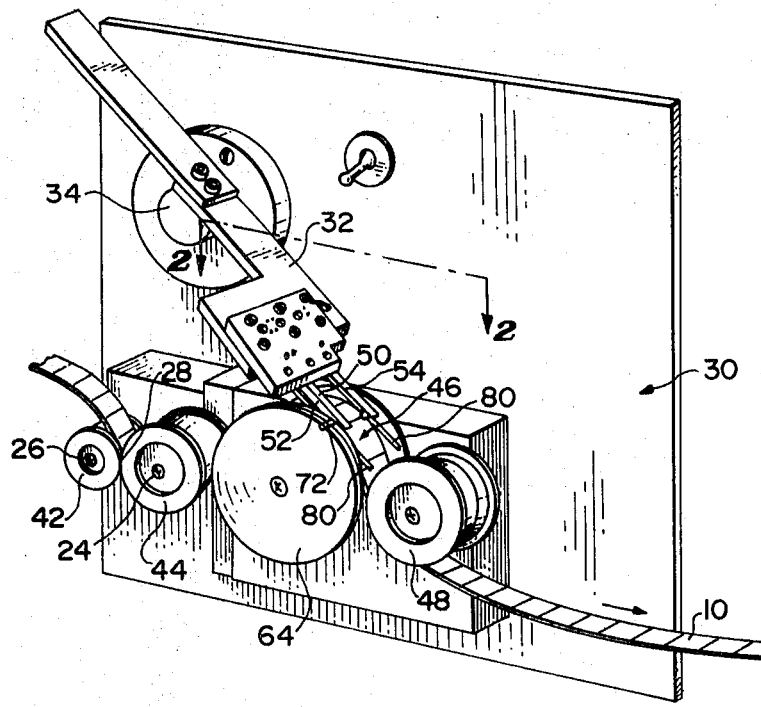
FIG. 1 is a perspective view of the head portion embodying a preferred embodiment of the invention for detecting edge breaks in motion picture film.
Figure 2:
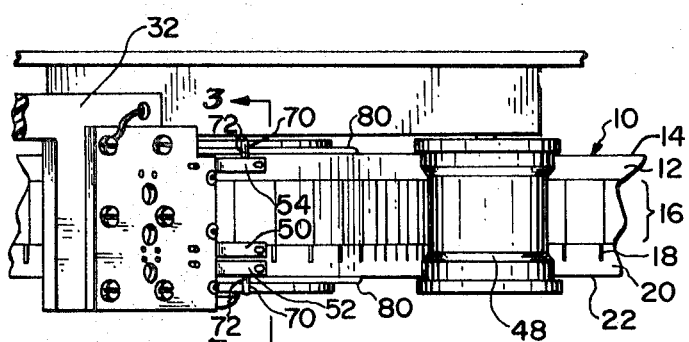
FIG. 2 is an enlarged plan view taken on line 2—2 of FIG. 1.

A complete film detecting device is shown in said patent and the description herein takes up with the detecting head structure embodying the improved edge-break detecting device.

The film 10 can be referred to as conventional film having a sound track 12 along one edge 14, and a picture track 16 occupying a major portion of the film surface inwardly thereof. A sprocket track 18 for driving the film is located between the picture track and a continuous web 20 along the other edge 22 of the film.

As shown in FIG. 1 the film defect sensing apparatus includes a panel mounted head 30 which carries rollers 42 and 44 which sense the thickness of the film threaded and running between them, a support roller 46 which in connection with a guide roller 48 determines the path of film movement with respect to a feeler 50 detecting damage to sprocket holes and feelers 52 and 54 which detect breaks in the film extending to the edges 22 and 14 respectively. The roller 44 is journalled on a fixed axis by a screw 24 secured to the head 30 while the roller 42 is suitably supported on a pin 26 both for threading the film to run therebetween and for movement away from the roller 44 when detecting splices at the nip 28. The film passes from the nip around the roller 44, over roller 46 and under guide roller 48.

Figure 3:
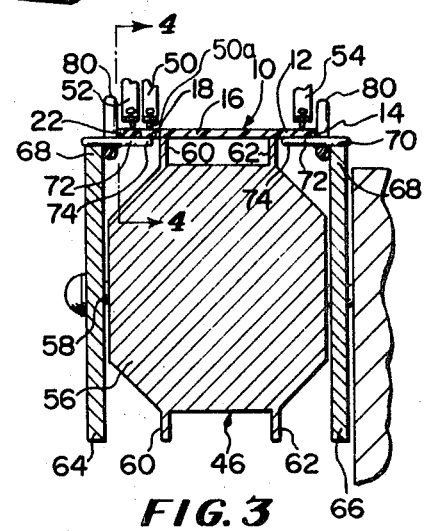
FIG. 3 is a further enlarged sectional view taken upon line 3—3 of FIG. 2.

The construction of the roller 46 is shown in FIG. 3 in which a spool-like wheel 56 is centrally journalled in a stationary axle 58 is peripherally provided with two spaced annular flanges 60 and 62 whose rims engage the film in supporting relationship at points spaced from the edges of the films, which points are preferably located at the sides of the picture track 16. This leaves the sound and sprocket tracks 12 and 18 overhanging and extending beyond the flanges. Side plates 64 and 66 are nonrotatively carried by the axle 58 at opposite ends of the roller 46 with portions 68 radially extending to approximately the level of the rims of the flanges 60, 62. These portions 68 are notched as shown at 70 in FIG. 3 to receive cylindrical jewel rod sections 72 essentially parallel to the axle 58 and disposed with their inner ends 74 extending inwardly beneath the edges 14 and 22 of the film to points adjacent the flanges 60 and 62. The rods 72 are located to engage the under surface of the film at each edge thereof and are positioned so that the upper edges thereof are in line with the periphery of the flanges 60 and 62. If desired, the rods 60 and 62 may be positioned slightly above the periphery of the flanges 60 and 62 to insure that the outer edges of the film ride on and are supported by the rods 72.

The feelers 52 and 54 are provided with jewels 76 with sled-like contours which ride on the film against the side thereof opposite to the jewel rod sections 72. The feelers are movable and are disposed slightly behind the section 72 so as to locate the feeler jewels 76 adjacent to the jewel sections 72 where they receive some support through the film from the jewel sections 72 yet not close enough to mutually interfere with relative movement between the jewels when a break in the film passes between them.

Figure 4:
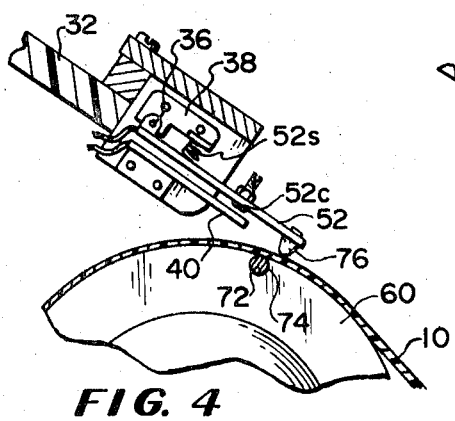
FIGS. 4 and 4a are further enlarged vertical sectional views taken upon line 4—4 of FIG. 3 showing the running and break detecting relationships respectively.
Figure 4A:
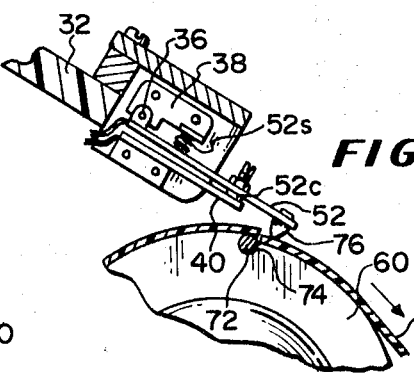

The operation of the feeler 52 and the jewels 72 and 76 are diagrammatically shown in FIGS. 4 and 4a where the feeler 52 is mounted on an insulating arm 32 which in turn is pivotally mounted on the head 30 by a pivot pin 34 so that the feelers 50, 52 and 54 may be raised as a unit when threading the film into place for testing as already described. When the arm is released it is urged against level locating stops (not shown) which permit the feelers to urge the jewels 76 into a mild pressure contact with the film which is sufficient to flex the film around the jewel rod sections 72 slightly to insure positive detection of edge cracks in the film at high speeds. This pressure will cause flexing of the film in a manner similar to that shown in FIGS. 6 and 7 wherein this flexing is shown in exaggerated form for purposes of illustration. It will be appreciated that the feelers may be spring blades for this purpose but in order to explain the forces and action involved, the feeler 52, as also representative of feeler 54, is shown pivoted as at 36 to a bracket 38 that is carried by the arm 32 and is urged by spring 52s to carry an adjustable electrical contact 52c into switch closing contact with a switch arm 40 that is also carried by the arm 32. Once the arm 32 is lowered after the film has been threaded into place, the jewel section 72 and the fixed switch contact perform as a unit with which the feeler jewel 76 movably cooperates with the jewel section 72 and the contact 52c movably cooperates with the switch arm 40. Then, as shown in FIG. 4a, when a break in the film, indicated at 78, comes between the jewels 72 and 76, the leading edge of the break, as it leaves the support of the jewel section 72, is depressed enough by the feeler 52 and jewel 76 for the contact 52c to engage the contact 40 and electrically signal a defect in the film for repair. Once these contacts engage they are supported against further depression by the fixed arm 40 and this distance can be adjusted for assured operation at exceptionally high speeds without further damage to the film.

It is to be noted at this point that with the jewel section 72 supporting the edge 20 of the film the jewel 76 is supported at a substantially constant and a rigidly supported level which fixes the starting point of the depression excursion and eliminates false indications which might otherwise occur with a sensitive adjustment or overly resilient film. The greater leeway afforded for significant relative movement between the jewels when film breaks are encountered makes this sensitivity safely possible. This is because the feeler adjustment does not require the wide allowance for continuous inherent deflection of a film edge where it is conventionally contacted where it overhangs unsupported a space that has to be provided below the film to accommodate for a drop-through movement of the feeler jewel in detecting a break defect. Moreover, in the present invention, the feeler pressure on the film can be substantially reduced, or increased if desired, and the film testing speed can be more than doubled with less possibility of test damage to the film because the significant drop-through of the feeler 76 can be restricted by the closer relative positioning of the contacts in the new relationship described.

In accordance with a further aspect of the invention, the jewel rod section 72 beneath the feeler 52 extends inwardly so as to provide support for the film beneath the sprocket defect feeler 50. The feeler 50 is provided with a jewel 50a having a length in the direction of film travel which is somewhat greater than the width of the sprocket holes 18 in this same direction so that the feeler 50 will not be depressed by engagement with sprocket holes in normal condition, as described in detail in said Pat. No. 2,699,676. However, the jewel 50a is, in accordance with the present invention spaced longitudinally from the jewel section 72 so as to permit substantial downward movement of the feeler 50 when a sprocket hole defect is encountered. By thus supporting the film adjacent the feeler 50 by means of the jewel rod section 72, false depressions of the feeler 50 are avoided while providing for substantial movement of this feeler when a sprocket defect is encountered. The feeler 50 may also engage a rigid contact arm, similar to the arm 40, so that downward movement of the feeler 50 is limited and the film being examined may be moved at high speed without further damage to the film.

Figure 5:
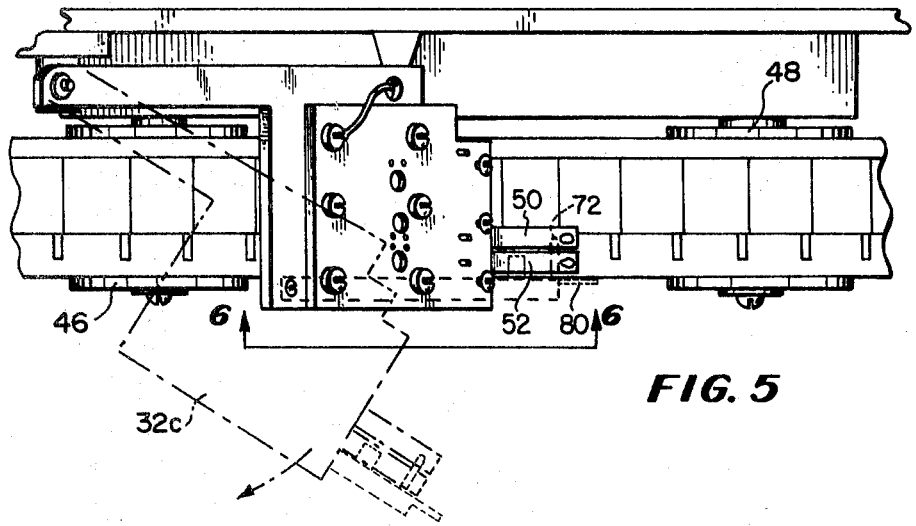
FIG. 5 is a plan view similar to FIG. 2 showing another embodiment of the invention.
Figure 6:
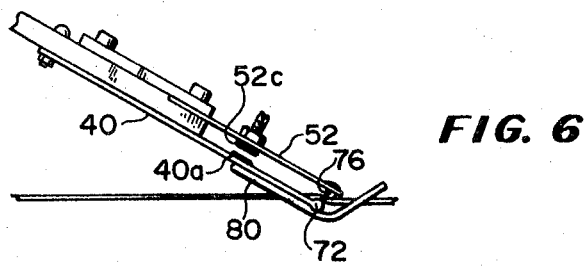
FIG. 6 is a sectional view taken along the line 6—6 of FIG. 5.

In FIGS. 5 and 6 an alternative embodiment of the invention is shown in which the insulating arm 32c need not be raised for threading the film but can be moved laterally, and, as shown in FIG. 6, does not engage the film where it is directed to follow a curved path, but rather can operate any place along a straight path of the film if desired. In FIG. 6 the jewel section 72 is carried directly by the fixed switch arm 40 to which is attached an offset contact arm 40a and both the rod 72 and feelers 50 and 52 are moved laterally or edgewise to the film in operative position on opposite face sides of the film 10 as shown in FIG. 5. When more than one edge is being test checked a corresponding arrangement is concurrently moved laterally into operative position from the other direction at the other edge. Preferably in this last instance the jewel sections 72 are oriented so that one of one set is above the film and the other of the other set is below the film in order to mutually dampen vertical lash of the film at high test speeds for accurate running of the feeler jewels. This eliminates the need for lash or whip dampening rollers and reduces wear upon the film.

Figure 7:
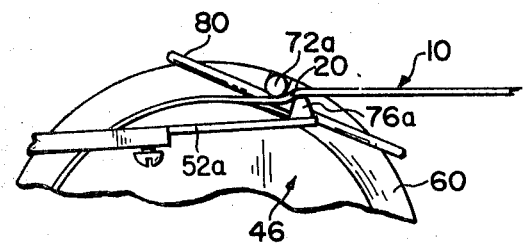
FIGS. 7 and 7a are sectional views similar to FIGS. 4 and 4a but showing the operation of a further embodiment of the invention.
Figure 7A:
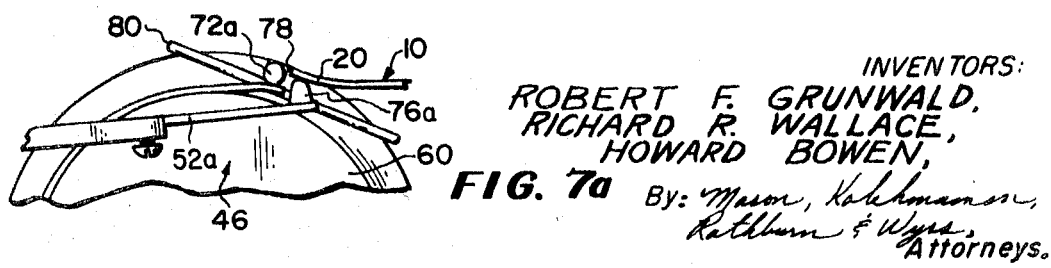

FIG. 7 shows a further alternative arrangement generally similar to FIGS. 1 to 4, inclusive, but with the jewel sections 72a mounted on the side plates 64 and 66 above the film and the feelers 52a and feeler jewels 76a located below the film along a straight path of the film just beyond the point that the film engages the roller 46 with a steady test contact that prevents whipping at high test speeds. Here again the jewels engaging opposite face sides of the film exert opposing displacement forces upon the film edge which is under tension between the rollers 46 and 48. Electrical contacts 40 and 52c shown in FIG. 4 are also provided for the relationship shown in FIG. 7 which close when there is any appreciable outward movement of the jewel 76a when a break in the film is encountered, as already described.

In all embodiments it is preferred to provide edge guides for the film on opposite side edges of the film for accurate location of the film edges with respect to the feeler jewels 76. In FIGS. 1 and 7 the guides comprise elongated rod-like jewels 80 mounted by cement on the inner faces of the side plates 64, 66 radially inside of the jewel sections 72 or 72a and in parallel relationship so that the film is held against side slip ahead of and beyond the jewel sections 72 or 72a. This prevents the displacement pressure contact at the film edges just ahead of the jewels 76 from causing any side slip. Also, in the embodiments described heretofore the jewel sections 72 may be mounted vertically with the end thereof in engagement with the face of the film opposite the face engaged by the feeler jewel, rather than being mounted horizontally, as shown in the drawings, with the film in engagement with the side thereof, as will be readily understood by those skilled in the art. In such case, the end of the jewel section 72 will preferably be aligned longitudinally of the film with the jewel 76 on the feeler 52 to provide support in the vicinity of the jewel 76 and will not provide as much support adjacent the jewel 50a.

In FIG. 6 the side guide jewels 80 are carried on the fixed switch arms 40 which when they swing into operative position dispose the guide jewels 80 against the edges of the film. In this instance the guide jewels are bent intermediate their ends as shown in FIG. 6 to provide contact with the edge of the film ahead of and beyond the jewel section 72. In both instances the supporting parts are disposed in a jig and the jewels 72 and 80 are cemented in place upon the switch arm 40.

The jewels described herein are of synthetic ruby or sapphire, or silicon carbide or boron nitride material, or the like, and ride against the film without any significant wear or tendency to damage the film. Because of this, it is to be noted that where jewels are the sole means for holding and contacting the film, the test speed of the film is not limited by inertia factors such as those involved with rollers that speed up and are stopped quickly by the film itself.

The electrical indicator circuits controlled by the feeler switches herein described are represented by the circuits further disclosed in said Pat. No. 2,699,676.

Having thus described our invention including several high speed embodiments where the film itself is the sole interconnection between and supported by the feelers it will be understood how further modification of the cooperating elements can be made without departing from the spirit of the invention.

What is claimed as new and desired to be secured by Letters Patent of the United States is:

1. In a film inspecting device for detecting partial transverse breaks extending inwardly from an edge thereof, drive means for advancing the film along a predetermined test path, a first member fixedly positioned outside said test path and including a portion extending inwardly from the outer edge of the film and continuously in engagement with one face of the film at the edge thereof, and a second member positioned adjacent the opposite face of the film and slightly displaced from said first member along said film path, said second member being movable in a direction generally perpendicular to said path, means for biasing said second member continuously into engagement with the opposite face of that portion of the film which is engaged by said first member so that said second member moves in said direction into the path of the film in response to deflection of one edge of a break in said film at said edge thereof, and means for developing a control signal in response to said movement of said second member in said direction.

2. The combination of claim 1, wherein said portion of said first member comprises a rod-like jewel positioned beneath the film in engagement with said one face thereof as the film moves along said path, and said second member comprises a flexible arm positioned above the film and carrying a jewel in engagement with the opposite face of the film.

3. The combination of claim 1, wherein said portion of said first member extends inwardly beneath the sprocket holes of the film adjacent said one edge thereof, and a third member is positioned to engage said opposite face of the film in line with the sprocket holes thereof and biased into engagement with said opposite face at a point slightly ahead of said first member along said path.

4. The combination of claim 3, including a support means carrying both said second and third members for movement into and out of engagement with said opposite face of said film.

5. The combination of claim 1, including a support means carrying said second member for movement into and out of engagement with said opposite face of said film.

References Cited
UNITED STATES PATENTS

| | | | |
|---|---|---|---|
| 2,469,608 | 5/1949 | Phillimore | 73—157 |
| 2,699,676 | 1/1955 | Grunwald | 73—157 |
| 2,934,949 | 5/1960 | Grunwald | 73—157 |
| 3,501,760 | 3/1970 | Menary | 73—157 |

LOUIS R. PRINCE, Primary Examiner

D. E. CORR, Assistant Examiner

U.S. Cl. X.R.

73—159